United States Patent
Kwon

(10) Patent No.: US 10,291,153 B2
(45) Date of Patent: May 14, 2019

(54) ELECTRODE STACKED ENERGY CONVERSION DEVICE USING LIQUID

(71) Applicant: KOREA ELECTRONICS TECHNOLOGY INSTITUTE, Seongnam-si, Gyeonggi-do (KR)

(72) Inventor: Soon Hyung Kwon, Seongnam-si (KR)

(73) Assignee: KOREA ELECTRONICS TECHNOLOGY INSTITUTE, Seongnam-si, Gyeonggi-do (KR)

(*) Notice: Subject to any disclaimer, the term of this patent is extended or adjusted under 35 U.S.C. 154(b) by 156 days.

(21) Appl. No.: 15/406,577

(22) Filed: Jan. 13, 2017

(65) Prior Publication Data
US 2017/0149358 A1  May 25, 2017

Related U.S. Application Data

(63) Continuation of application No. PCT/KR2015/005838, filed on Jun. 10, 2015.

(30) Foreign Application Priority Data

Jul. 15, 2014 (KR) .................. 10-2014-0089202

(51) Int. Cl.
*H02N 2/18* (2006.01)
*H02N 1/08* (2006.01)

(52) U.S. Cl.
CPC .............. *H02N 1/08* (2013.01); *H02N 2/185* (2013.01); *H02N 2/18* (2013.01)

(58) Field of Classification Search
CPC .. H01L 41/083; H01L 41/113; H01L 41/1132; H01L 41/1138; H01L 41/125;
(Continued)

(56) References Cited

U.S. PATENT DOCUMENTS 6,011,346 A * 1/2000 Buchanan ........... E21B 41/0085
                                                310/339
6,424,079 B1 * 7/2002 Carroll ................ H02N 2/185
                                                310/339
(Continued)

FOREIGN PATENT DOCUMENTS

JP        2010-517755 A    5/2010
KR   10-2011-0056867 A    5/2011
(Continued)

OTHER PUBLICATIONS

International Search Report dated Oct. 8, 2015 in International Application No. PCT/KR2015/005838, filed Jun. 10, 2015.
(Continued)

*Primary Examiner* — Burton S Mullins
(74) *Attorney, Agent, or Firm* — Knobbe Martens Olson & Bear LLP

(57) ABSTRACT

The described technology relates to an energy conversion device using a liquid, and an electrode laminate structure energy conversion apparatus using a liquid. The device includes a substrate, a first electrode formed on the substrate, and an energy conversion layer formed on the first electrode so as to cover the first electrode. The device also includes a second electrode formed on the first energy conversion layer and of which a contact state with the liquid is changed according to a movement or a state change of the liquid. An electric energy generation device having an excellent integration characteristic can be implemented by a form of the electrode structure, a device can be miniaturized by a vertical electrode structure, and a high-efficiency energy conversion device can be implemented by generating various voltages according to the number of upper electrodes and the number of lower electrodes.

4 Claims, 8 Drawing Sheets

(58) Field of Classification Search
CPC .. H02N 1/00; H02N 1/08; H02N 1/06; H02N 11/002; H02N 2/18; H02N 2/185
USPC ................................................ 310/300, 329
See application file for complete search history.

(56) References Cited

U.S. PATENT DOCUMENTS

| | | | | |
|---|---|---|---|---|
| 7,034,432 | B1* | 4/2006 | Pelrine | F02G 1/043 |
| | | | | 310/309 |
| 7,235,914 | B2* | 6/2007 | Richards | F02B 75/34 |
| | | | | 310/324 |
| 7,859,171 | B2* | 12/2010 | Micallef | H01G 9/028 |
| | | | | 152/152.1 |
| 7,898,096 | B1* | 3/2011 | Krupenkin | H02N 1/08 |
| | | | | 290/1 R |
| 8,003,982 | B2* | 8/2011 | Wang | H02N 2/18 |
| | | | | 257/43 |
| 8,054,530 | B2* | 11/2011 | Ryu | G02F 1/167 |
| | | | | 359/291 |
| 8,405,285 | B2* | 3/2013 | Kobayashi | B41J 2/14233 |
| | | | | 310/358 |
| 10,090,783 | B2* | 10/2018 | Kwon | H02N 11/002 |
| 10,103,654 | B2* | 10/2018 | Yun | H02N 11/002 |
| 2005/0206275 | A1* | 9/2005 | Radziemski | H01L 41/1136 |
| | | | | 310/339 |
| 2007/0125176 | A1* | 6/2007 | Liu | H01L 41/1136 |
| | | | | 73/649 |
| 2010/0072859 | A1 | 3/2010 | Jager et al. | |
| 2011/0134196 | A1* | 6/2011 | Kim | B41J 2/14233 |
| | | | | 347/71 |
| 2012/0044299 | A1* | 2/2012 | Winger | B41J 2/1606 |
| | | | | 347/54 |
| 2014/0210313 | A1* | 7/2014 | Kim | H02N 2/18 |
| | | | | 310/339 |
| 2015/0001993 | A1* | 1/2015 | Park | H01L 41/113 |
| | | | | 310/319 |
| 2015/0303831 | A1 | 10/2015 | Kwon et al. | |
| 2016/0111980 | A1* | 4/2016 | Sun | H02N 2/185 |
| | | | | 310/339 |
| 2017/0179853 | A1* | 6/2017 | Choi | H01G 11/26 |
| 2018/0375445 | A1* | 12/2018 | Oya | H02N 11/00 |

FOREIGN PATENT DOCUMENTS

| | | |
|---|---|---|
| KR | 10-2014-0069565 A | 6/2014 |
| KR | 10-1411337 B1 | 6/2014 |
| WO | WO 2008/147568 A1 | 12/2008 |

OTHER PUBLICATIONS

Extended European Search Report received in European Patent Application EP 15 821 895.8, dated Mar. 8, 2018.

* cited by examiner

ELECTRODE STACKED ENERGY CONVERSION DEVICE USING LIQUID

CROSS-REFERENCE TO RELATED APPLICATIONS

This application is a continuation application, and claims the benefit under 35 U.S.C. §§ 120 and 365 of PCT Application No. PCT/KR2015/005838, filed on Jun. 10, 2015, which is hereby incorporated by reference. PCT/KR2015/005838 also claimed priority from Korean Patent Application No. 10-2014-0089202, filed on Jul. 15, 2014, which is hereby incorporated by reference.

BACKGROUND

Field

The described technology relates to an energy conversion device using liquid, more particularly, to an energy conversion device converting the mechanical energy generated by the flow of a liquid into an electrical energy.

Description of the Related Technology

The energy conversion technologies of the prior art for converting mechanical energy into electrical energy use a principle that electrical capacitance is created in the electrode under a dielectric material by varying the contact surface of a liquid metal which is in contact with a dielectric material in accordance with the flow of time.

A method and a device for converting energy using a fluid of the prior art is disclosed in the U.S. Pat. No. 7,898,096.

In the energy conversion device of the prior art using a fluid, an electrode having a predetermined pattern is formed on the wall having the shape of a thin and long channel, and a dielectric material layer is formed above the electrode. Then, a small waterdrop-like conductive liquid and a non-conductive liquid are injected into the channel, and the conductive liquid is depolarized by applying a voltage from an external power source to such waterdrop-like conductive liquid.

At this state, when a physical pressure is applied to a predetermined portion (not shown) which is connected to the channel the depolarized waterdrop-like conductive liquid is moved along the channel, and during this process, the contact surface of the multiple electrodes, which is formed with a consistent pattern, with the moving multiple conductive liquid drop is continuously changing with time, and as a result, an electrical energy is generated due to the electrical capacitance change.

However, a method and a device of the prior art for converting energy using a fluid have various problems for commercialization.

First, since the reversible movement, wherein a drop-like liquid metal which has been moved inside the narrow and thin channel returns back to its original position when the external force is removed, is difficult, there is a limitation in that a separate lubricating layer is required and an inoperable condition happens due to the easy occurrence of channel blocking phenomenon.

Moreover, since the method and the device of the prior art for converting energy using a fluid adopt a narrow and thin channel structure, the two facing electrodes must be patterned in a predetermined shape on the channel wall making the device configuration complicated due to such a structure, and the size of the module generating electrical energy becomes large, and there has been many limitations in mass production or cost reduction.

In addition, as for other problems, using a liquid metal such as mercury or galinstan is harmful to the human body and the environment, and there is a limitation in that a separate external power must be applied for depolarizing such a conductive liquid.

Further, the method and the device of the prior art for converting energy using a fluid have problems in that the reversible movements in the channel structure must be continuously implemented, and the control is difficult since two different kinds of immiscible liquids must be used.

SUMMARY OF CERTAIN INVENTIVE ASPECTS

One inventive aspect relates to a method and a device for converting energy using a liquid, especially for generating electrical energy by changing the contact surface between the liquid and the electrodes in the device.

Another aspect is an efficient method and a device for converting energy while having a simple structure and a lower failure rate through implementation of a structure wherein electrodes are stacked using an energy conversion layer.

For solving aforementioned technical problems, an electrode stacked energy conversion device using a liquid comprises: a substrate; a first electrode formed in the substrate; a first energy conversion layer formed in the first electrode and covering the first electrode; and a second electrode formed on the first energy conversion layer, wherein the contact state of the second electrode with respect to the liquid changes according to the movement or the state of the liquid.

The electrode stacked energy conversion device using a liquid may further comprise a second energy conversion layer formed on the second electrode and covering the second electrode.

In some embodiments, the first electrode includes a plurality of first electrodes formed on the substrate and spaced apart from each other with a predetermined distance along a certain direction.

In some embodiments, the second electrode includes a plurality of second electrodes formed on the energy conversion layer and spaced apart from each other with a predetermined distance along a direction which is crossing the certain direction.

The first energy conversion layer may comprise at least any one of an inorganic material layer, an organic material layer, and a mixed material layer of organic and inorganic materials.

In some embodiments, a hydrophobic material layer is stacked on the first energy conversion layer so that the shape of the ionic liquid or water can be restored.

In some embodiments, an insulation layer is formed between the hydrophobic material layer and the second electrode.

An electric energy generating device having a superior integrating property can be implemented through the electrode structure according to embodiments, and miniaturization of the device becomes possible through the vertical electrode structure, and the various voltages can be generated according to the number of the upper and the lower electrodes, and therefore a high efficiency energy conversion device can be implemented.

DETAILED DESCRIPTION OF CERTAIN INVENTIVE EMBODIMENTS

Contents of the description below merely exemplify the principle of the invention. Therefore those of ordinary skill in the art may implement the theory of the invention and invent various apparatuses which are included within the concept and the scope of the invention even though it is not clearly explained or illustrated in the description. Furthermore, in principle, all the conditional terms and embodiments listed in this description are clearly intended for the purpose of understanding the concept of the invention, and one should understand that this invention is not limited to such specially listed exemplary embodiments and the conditions.

The above described objectives, features, and advantages will be more apparent through the following detailed description related to the accompanying drawings, and thus those of ordinary skill in the art may easily implement the technical spirit of the invention.

A detailed description of a publicly known prior art related to the present invention will be omitted if determined that it may unnecessarily obscure the gist of the present invention. Hereinafter, exemplary embodiments will be described in detail with reference to the accompanying drawings.

Figure 1:
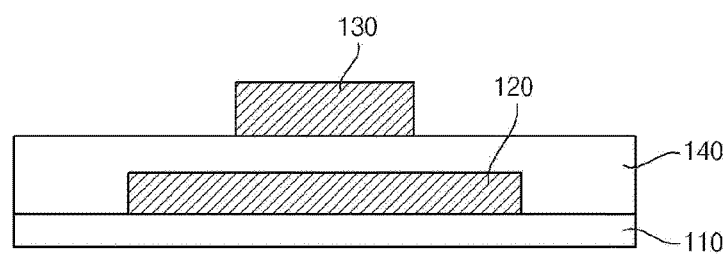
FIGS. 1 to 3 are the cross-sectional views of the electrode stacked energy conversion devices using liquid according to an exemplary embodiment of the present invention.

FIG. 1 is a view illustrating an electrode stacked energy conversion device using liquid (hereinafter referred to as "energy conversion device") according to an exemplary embodiment of the present invention.

Referring to FIG. 1, an energy conversion device according to an exemplary embodiment of the present invention comprises: a substrate 110, a first electrode 120, an energy conversion layer 140, and a second electrode 130.

The substrate 110 according to an exemplary embodiment of the present invention is a basic element for forming a plurality of element on the upper side thereof in order to implement the energy conversion device. In the present exemplary embodiment, the first electrode 120, the energy conversion layer 140, the second electrode 130, and the like can be formed directly or indirectly on the substrate 110. Forming indirectly means that the elements are not formed directly on the substrate 110, but instead, they can be formed on the upper side of the other elements that had already been formed on the substrate 110.

In other words, in the exemplary embodiment of the present invention, the energy conversion layer 140, the second electrode 130, and the like can be formed directly on the substrate 110, or formed indirectly on the first electrode 120 that had been formed on the substrate 110, or formed possibly on the energy conversion layer 140 that had been formed on the substrate 110.

Although forming the elements on the upper surface of the substrate 110 is illustrated in the present exemplary embodiment as an example, but instead, forming respectively on the front and rear surfaces with respect to the substrate 110 is also possible depending on the cases.

In the present exemplary embodiment, the first electrode 120 is formed on the substrate 110 as described above. In forming on the substrate 110, it is possible to form so as to cover all of the substrate 110 across the entire front surface of the substrate 110, and it is also possible to form on a portion thereof as shown in FIG. 1.

Figure 4:
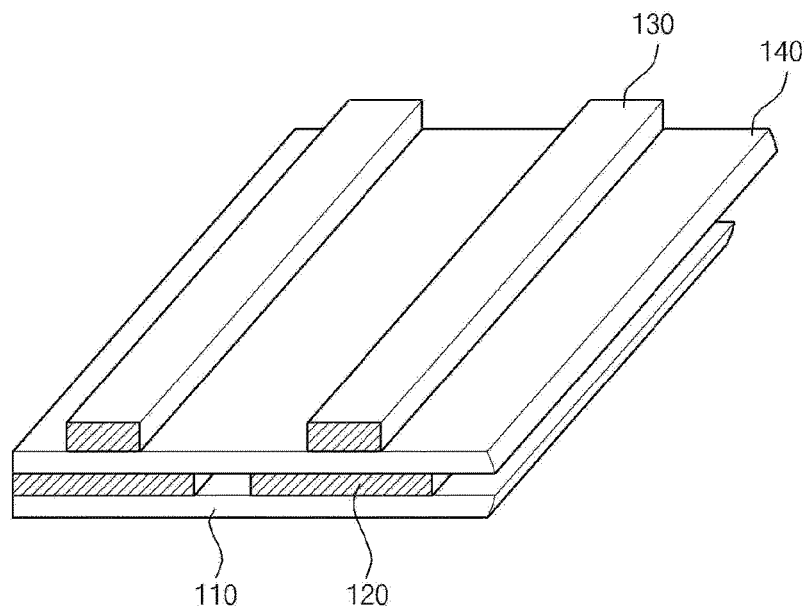
FIGS. 4 to 5 are the views of the electrode stacked energy conversion devices using liquid according to an exemplary embodiment of the present invention.

In addition, it is also possible to be formed as a single element, and it is also possible to be formed as two electrodes having a predetermined gap therebetween as shown in FIG. 4. Further, it is also possible that a plurality of electrodes is patterned on the substrate 110 according to the predetermined gap or the shape thereof.

In the present exemplary embodiment, the energy conversion layer 140 can be formed on the first electrode 120 formed on the substrate 110 in a way that it covers the first electrode 120 as shown in FIG. 1. Preferably, the energy conversion layer 140 is formed to cover the first electrode 120 in order to prevent electrical short of the first electrode 120.

In the present exemplary embodiment, the energy conversion layer 140 is composed by stacking an inorganic material layer and/or an organic material layer. Preferably, forming of such energy conversion layer 140 can be formed by using processes such as vacuum deposition, spin coating, and spraying, and more than one separated body can be formed through the patterning process.

Also, the energy conversion layer 140 may comprise an organic layer 230 containing at least one material of Poly (methyl methacrylate) (PMMA), Polyethylene (PE), Polystyrene (PS), Polyvinylpyrrolidone (PVP), Poly(4-vinylpenol) (PVP), or Polyethersulfone (PES), Poly(4-methoxyphenyl acrylate) (PMPA), Poly(phenyl acrylate) (PPA), Poly(2,2,2-trifluoroethyl methacrylate) (PTFMA), cyanoethylpullulan (CYEPL), Polyvinyl chloride (PVC), Poly(parabanic acid) resin (PPA), Poly(t-butylstyrene) (PTBS), Polythienylenevinylene (PTV), Polyvinyl acetate (PVA), Poly(vinyl alcohol) (PVA), Poly(r-methylstyrene) (PAMS), Poly(vinyl alcohol)-co-poly(vinyl acetate)-co-poly (itaconic acid) (PVAIA), Polyolefin, Polyacrylate, Parylene-C, Polyimide, octadecyltrichlorosilane (OTS), Poly(triarylamine) (PITA), Poly-3-hexylthiophene (P3HT), cross-linked Poly-4-vinylphenol (cross-linked PVP), Poly (perfluoroalkenyl vinyl ether), Nylon-6, n-Octadecylphosphonic acid (ODPA), Polytetrafluoroethylene, PTFE), silicone, polyurethane, latex, cellulose acetate, Poly(hydroxy ethyl methacrylate) (PHEMA), Polylactide (PLA), Polyglycolide (PGA), or Poly(glycolide-co-lactide) (PGLA); and an inorganic material layer containing at least one material from silicon dioxide ($SiO_2$), titanium dioxide ($TiO_2$), aluminum oxide ($Al_2O_3$), tantalum pentoxide ($Ta_2O_5$), zinc oxide (ZnO), yttrium oxide ($Y_2O_3$), cerium oxide ($CeO_2$), barium titanate ($BaTiO_3$), barium zirconate titanate (BZT), zirconium dioxide ($ZrO_2$), lanthanum oxide ($La_2O_2$), hafnium ($HfSiO_4$), lanthanum aluminate ($LaAlO_3$), silicon nitride ($Si_3N_4$), and as for perovskite materials, strontium titanate ($SrTiO_3$), barium strontium titanate (BST), lead zirconate titanate (PZT), calcium copper titanate (CCTO), hafnium oxide ($HfO_2$), apatite ($A_{10}$ ($MO_4)_6X_2$), hydroxyapatite ($Ca_{10}(PO_4)_6(OH)_2$), tricalcium phosphates ($Ca_3(PO_4)_2$), $Na_2O$—CaO—$SiO_2$, or bioglass (CaO—$SiO_2$—$P_2O_5$).

Further, it is also possible to use polytetrafluoroethylene, ethylene-tetrafluoroethylene, fluorinated ethylene propylene (FEP), and perfluoroalkoxy copolymer.

Preferably, a material having a dielectric constant (K) equal to or less than 4 can be used for the organic material layer, and a material having a dielectric constant (K) greater than 5 can be used for the inorganic material layer.

The second electrode 130 of the present exemplary embodiment is formed on the energy conversion layer 140 so that it is overlapped with the first electrode 120 along the vertical direction, and its contact state with respect to the liquid is changing depending on the movement or the state change of the liquid.

The above described energy conversion device according to the present exemplary embodiment generates energy according to the change of the contact state of the second electrode 130 or the energy conversion layer 140 with the liquid in accordance with the movement or the state change of the liquid.

In other words, as the liquid flows above the first or the second electrode 130, the change in the capacitance occurs due to the resulting change of the contact state, and a potential difference is produced thereby. Thus, energy can be generated from the movement of electrons trying to compensate the aforementioned potential difference.

Figure 2:
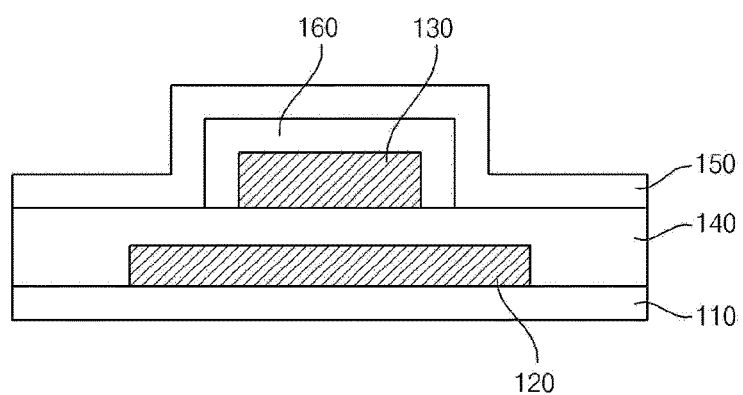
Figure 3:
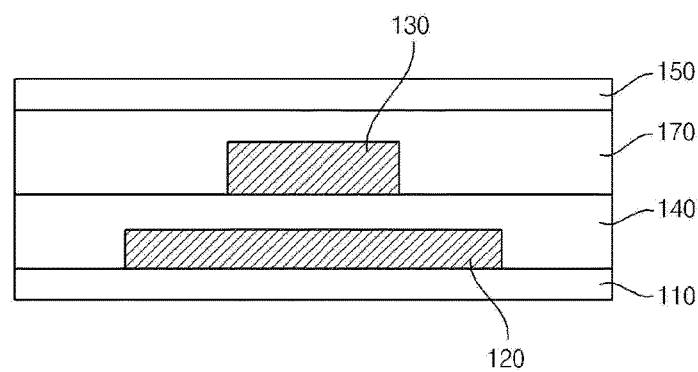
Figure 5:
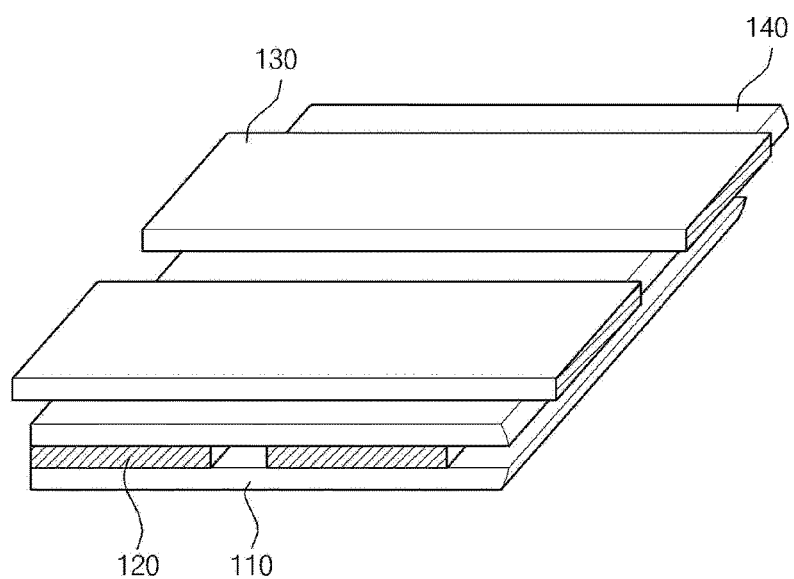

Thus, as shown in FIGS. 1 to 3, the second electrode 130 can be formed overlapped with the first electrode 120. Although the second electrode 130 is entirely overlapped with the first electrode 120 as illustrated in FIGS. 1 to 3, they can be partially overlapped as illustrated in FIG. 4 or FIG. 5.

The first electrode 120 and the second electrode 130 of the energy conversion device according to the present exemplary embodiment are not formed in the same planar surface, or formed separately spaced apart with a predetermined distance along the horizontal direction, but instead, they are formed partially or entirely overlapped with each other along the vertical direction.

Figure 6:
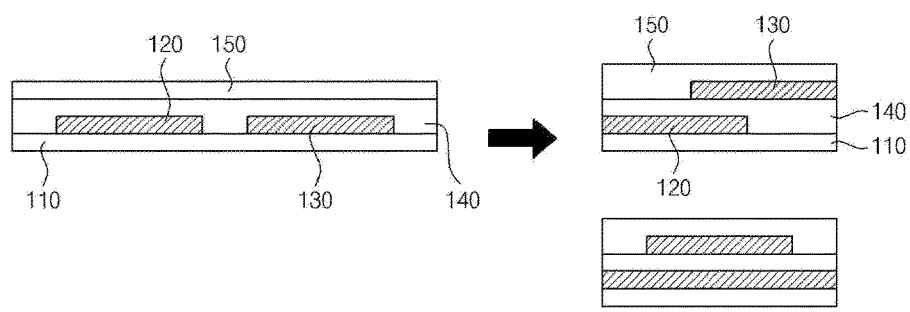
FIG. 6 is a view illustrating integration of an electrode stacked energy conversion devices using liquid according to an exemplary embodiment of the present invention.

That is, since it is a structure wherein the second electrode 130 and the first electrode 120 are located respectively in the upper side and the lower side of the energy conversion layer 140 which is located between them, one embodiment has a structure wherein integration is more facilitated than the energy generation device having a planar structure as shown in FIG. 6.

In the above described description, the electrode may be: an inorganic electrode comprising at least any one of ITO, IGO, chrome, aluminum, indium zinc oxide (IZO), indium gallium zinc oxide (IGZO), ZnO, $ZnO_2$ or $TiO_2$; or a metal electrode comprising at least any one of platinum, gold, silver, aluminum, iron or copper; or an organic electrode comprising at least any one of polyethylenedioxythiophene (PEDOT), carbon nano tube (CNT), graphene, polyacetylene, polythiophene (PT), polypyrrole, polyparaphenylene (PPV), polyanilinep), poly sulfur nitride, stainless steel, iron alloy containing more than 10% of crome, SUS 304, SUS 316, SUS 316L, Co—Cr alloy, Ti alloy, nitinol (Ni—Ti) or polyparaphenylenevinylene.

Further, the energy conversion device according to the present exemplary embodiment may further comprise a hydrophobic material layer. The shape of the liquid according to the present exemplary embodiment is changed as the contact surface, the contact angle, or the contact area with respect to the second electrode 130 or the first electrode 120 is changed, therefore, in order to restore such deformation into its original shape, the hydrophobic material layer 150 is stacked on the electrode. According to the present exemplary embodiment, the hydrophobic material layer 150 may comprise at least any one or the mixture of silane series material, fluoropolymer material, trichlorosilane, trimethoxysilane, pentafluorophenylpropyltrichlorosilane, (benzyloxy)alkyltrimethoxysilane (BSM-22), (benzyloxy)alkyltrichlorosilane (BTS), hexamethyldisilazane (HMDS), octadecyltrichlorosilane (OTS), octadecyltrimethoxysilane (OTMS), and divinyltetramethyldisiloxane-bis(benzocyclobutene) (BCB).

Also, referring to FIG. 2, the energy conversion device according to the present exemplary embodiment may further comprise an insulating layer 160. That is, the second electrode 130 is insulated by the insulating layer 160, thereby enhancing the electrical stability of the energy conversion device implemented in accordance with the present exemplary embodiment.

Next, referring to FIG. 3, the energy conversion device according to the present exemplary embodiment may further comprise a second energy conversion layer 170 formed on the second electrode 130 and covering the second electrode 130.

In other words, it is also possible that the second energy conversion layer 170 is additionally formed on the second electrode 130 together with the first energy conversion layer 140 formed on the first electrode 120.

Also, although further forming of a hydrophobic material layer 150 on the second energy conversion layer 170 is illustrated in FIG. 3, it is also possible that the hydrophobic material layer 150 can be omitted when the second energy conversion layer 170 is a hydrophobic material.

Hereinafter, the structure of the energy conversion device capable of generating much higher capacity energy by using the energy conversion device according to the aforementioned exemplary embodiment will be described with reference to FIG. 4 or FIG. 5.

Referring to FIG. 4, the first electrode 120 of the present exemplary embodiment can include a plurality of first electrodes spaced apart from each other with a predetermined distance from one another along a certain direction.

Also, the energy conversion layer 140 is stacked on the first electrode 120, and the second electrode 130 can be formed overlapped with the first electrode 120 along the vertical direction while the energy conversion layer 140 is interposed therebetween.

In the structure of the present exemplary embodiment, a potential difference occurs between the first electrode 120 and the second electrode 130 formed on the first electrode 120, and energy can be generated through this potential difference. In the present exemplary embodiment, the plurality of the first electrodes and the plurality of the second electrodes are formed along the same direction; therefore, a variety of voltages can be generated according to the number of formed electrodes.

Next, referring to FIG. 5, the first electrode 120 of the present exemplary embodiment can include a plurality of first electrodes spaced apart from each other with a predetermined distance along a certain direction.

Also, the energy conversion layer 140 is stacked on the first electrode 120, and a second electrode 130 can be formed overlapped with the first electrode 120 along the vertical direction while the energy conversion layer 140 is interposed therebetween. However, unlike the FIG. 4 the second electrode 130 of the present exemplary embodiment is formed along the crossing direction of the first electrode 120.

That is, the electrodes are arranged along the direction orthogonal to each other as shown in FIG. 5, thus, a more variety of potential differences between the electrodes, thereby possibly generating a variety of voltages.

Further, FIGS. 4 and 5 exemplary illustrate that each of the first electrode 120 and the second electrode 130 include a plurality of electrodes. However, they can be formed in a way that the first electrode 120 can be formed by a single electrode plate while the second electrode 130 includes a plurality of electrodes spaced apart from one another with a predetermined distance along a certain direction. Or, it is also possible that the second electrode 130 is formed by a single electrode plate while the first electrode 120 includes a plurality of electrodes spaced apart from one another with a predetermined distance along the consistent direction on the substrate.

Also, in the aforementioned exemplary embodiment, the substrate 110 wherein a plurality of elements is formed may possibly comprise a textile material (nylon, cotton, polyester, and the like). At this time, it is also possible that by applying the configuration same as FIG. 5 to the weaving structure of a cloth (that is, a textile) wherein a material capable of forming electrode is synthesized to be used as a weft thread and a warp thread which are crossing each other in the cloth, so that energy can be generated from the liquid flow on the substrate 110 made of the cloth.

At this time, the weft thread and the warp thread can be functioned as a first electrode 120 and a second electrode 130 respectively. Also, the weft thread and the warp thread are alternately positioned in the upper and the lower side in a cloth structure, the functions of the first electrode 120 and the second electrode 130 can be performed alternately in the aforementioned exemplary embodiment.

Also, the energy conversion layer 140 can be formed by the method wherein cloth is inserted during the weaving process of the weft thread and the warp thread.

The result of voltage generated through the energy conversion device according to the aforementioned embodiments will be described with reference to FIGS. 7 and 8.

Figure 7:
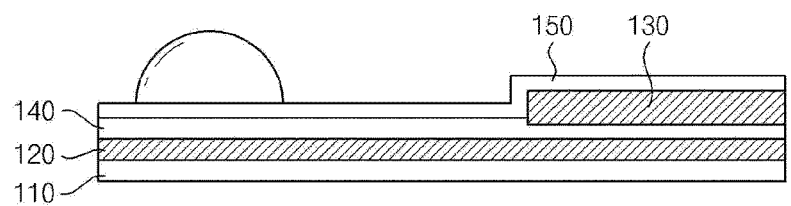
FIG. 7 is a view of an electrode stacked energy conversion devices using liquid according to an exemplary embodiment of the present invention.

Referring to FIG. 7, the energy conversion device is configured in a structure wherein the second electrode 130 is formed above the first electrode 120, and a hydrophobic material layer 150 is covering it. A liquid drop is flowing over the energy conversion device, and the resulting voltage generation is same as FIG. 8.

Figure 8:
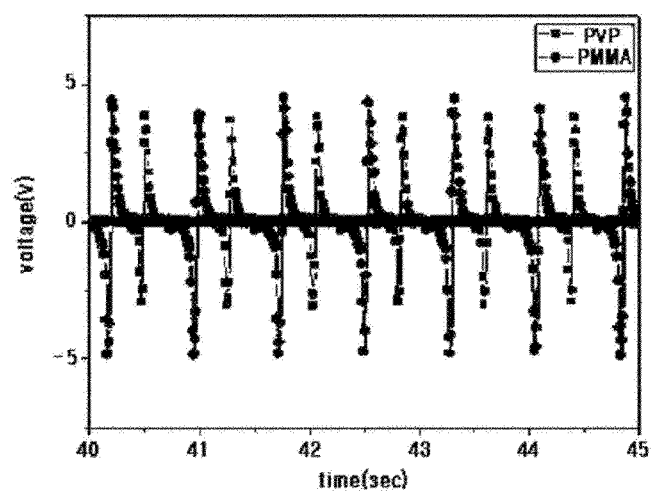
FIG. 8 is a view illustrating an experiment example of an electrode stacked energy conversion devices using liquid according to an exemplary embodiment of the present invention.

FIG. 8 is the result of using PMMA and PVP as materials of the energy conversion layer, which enables implementation of an electrical energy generating device having a superior integration property by using the aforementioned electrode structure according to embodiments. And, miniaturization of the device is possible through the vertical electrode structure, and a much higher efficiency energy conversion device can be implemented since a variety of voltages can be generated depending on the numbers of the upper side and the lower side electrodes.

Above description is merely an exemplary description of the technical spirit of the present invention, and various modifications, changes, and substitutions are possible for a person of skill in the art within the scope without deviating from the fundamental characteristics of the present invention.

Therefore, the exemplary embodiment and the accompanying drawings is for explanation and not for limiting the technical spirit of the present invention, and the scope of the technical spirit of the present invention is not limited by these exemplary embodiments and the accompanying drawings. The scope of protection of the present invention must be interpreted according to the following claims, and it must be interpreted in such a way that all the technical spirits within the equivalent scope of the present invention are included in the scope of the rights of the present invention.

The invention claimed is:

1. An energy conversion device using a liquid comprising:
a substrate;
a first electrode formed over the substrate;
a first energy conversion layer formed over the first electrode; and
a second electrode formed over the first energy conversion layer to overlap at least a portion of the first electrode in a vertical direction,
wherein a capacitance between the first and second electrodes is configured to change according to a liquid flow over the first or second electrode, and wherein the first energy conversion layer is configured to generate electrical power according to the capacitance change,
wherein the energy conversion device further comprises:
a second energy conversion layer formed over and covering the second electrode,
a hydrophobic material layer stacked over the first energy conversion layer, and
an insulating layer formed between the hydrophobic material layer and the second electrode.

2. The energy conversion device according to claim 1, wherein the first electrode includes a plurality of first electrodes formed on the substrate and spaced apart from each other with a predetermined distance along a first direction.

3. The energy conversion device according to claim 2, wherein the second electrode includes a plurality of second electrodes formed on the first energy conversion layer and spaced apart from each other with a predetermined distance along a second direction crossing the first direction.

4. The energy conversion device according to claim 1, wherein the first energy conversion layer comprises at least one of an inorganic material layer, an organic material layer, and a mixed material layer of organic and inorganic materials.

* * * * *